United States Patent
Davis et al.

(10) Patent No.: US 7,764,768 B2
(45) Date of Patent: Jul. 27, 2010

(54) PROVIDING CALEA/LEGAL INTERCEPT INFORMATION TO LAW ENFORCEMENT AGENCIES FOR INTERNET PROTOCOL MULTIMEDIA SUBSYSTEMS (IMS)

(75) Inventors: Thomas C. Davis, Homer Glen, IL (US); Pauline C. Lee, Lombard, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1513 days.

(21) Appl. No.: 10/959,266

(22) Filed: Oct. 6, 2004

(65) Prior Publication Data

US 2006/0072550 A1   Apr. 6, 2006

(51) Int. Cl.
*H04M 1/24* (2006.01)
(52) U.S. Cl. .......................... 379/35; 379/134
(58) Field of Classification Search ............ 379/35, 379/32.01, 32.05, 133, 134, 32.04; 370/230, 370/389, 392
See application file for complete search history.

(56) References Cited

U.S. PATENT DOCUMENTS

| | | | |
|---|---|---|---|
| 7,006,508 B2* | 2/2006 | Bondy et al. | 370/410 |
| 7,283,521 B1* | 10/2007 | Ryan | 370/389 |
| 7,570,743 B2* | 8/2009 | Barclay et al. | 379/35 |
| 2003/0227917 A1* | 12/2003 | Maher et al. | 370/392 |
| 2004/0071130 A1* | 4/2004 | Doerr et al. | 370/352 |
| 2004/0165709 A1* | 8/2004 | Pence et al. | 379/201.01 |
| 2004/0219911 A1* | 11/2004 | Kouchri et al. | 455/423 |
| 2005/0094651 A1* | 5/2005 | Lutz et al. | 370/401 |
| 2005/0094773 A1* | 5/2005 | Peterson | 379/35 |
| 2005/0174937 A1* | 8/2005 | Scoggins et al. | 370/230 |
| 2005/0175156 A1* | 8/2005 | Afshar et al. | 379/35 |
| 2006/0053010 A1* | 3/2006 | Chapman et al. | 704/235 |
| 2006/0067215 A1* | 3/2006 | Elliott et al. | 370/230 |
| 2009/0262723 A1* | 10/2009 | Pelletier et al. | 370/352 |

* cited by examiner

*Primary Examiner*—Olisa Anwah
(74) *Attorney, Agent, or Firm*—Werner Ulrich, Esq.

(57) ABSTRACT

A method and apparatus for providing useful packet data to a CALEA/Legal Intercept collection function. At an access point to a network such as the Internet, sources and destinations of data connections are examined to determine whether any of the bearer messages should also be routed to a CALEA/Legal Intercept monitoring system. If this condition is recognized, the bearer messages and corresponding signaling control messages are correlated in a call packet delivery application server and then delivered to a CALEA/Legal Intercept monitoring system. Advantageously, the monitoring receives as a bundled message set the bearer message and the control messages used to route and otherwise process these bearer messages.

8 Claims, 2 Drawing Sheets

Figure 1:
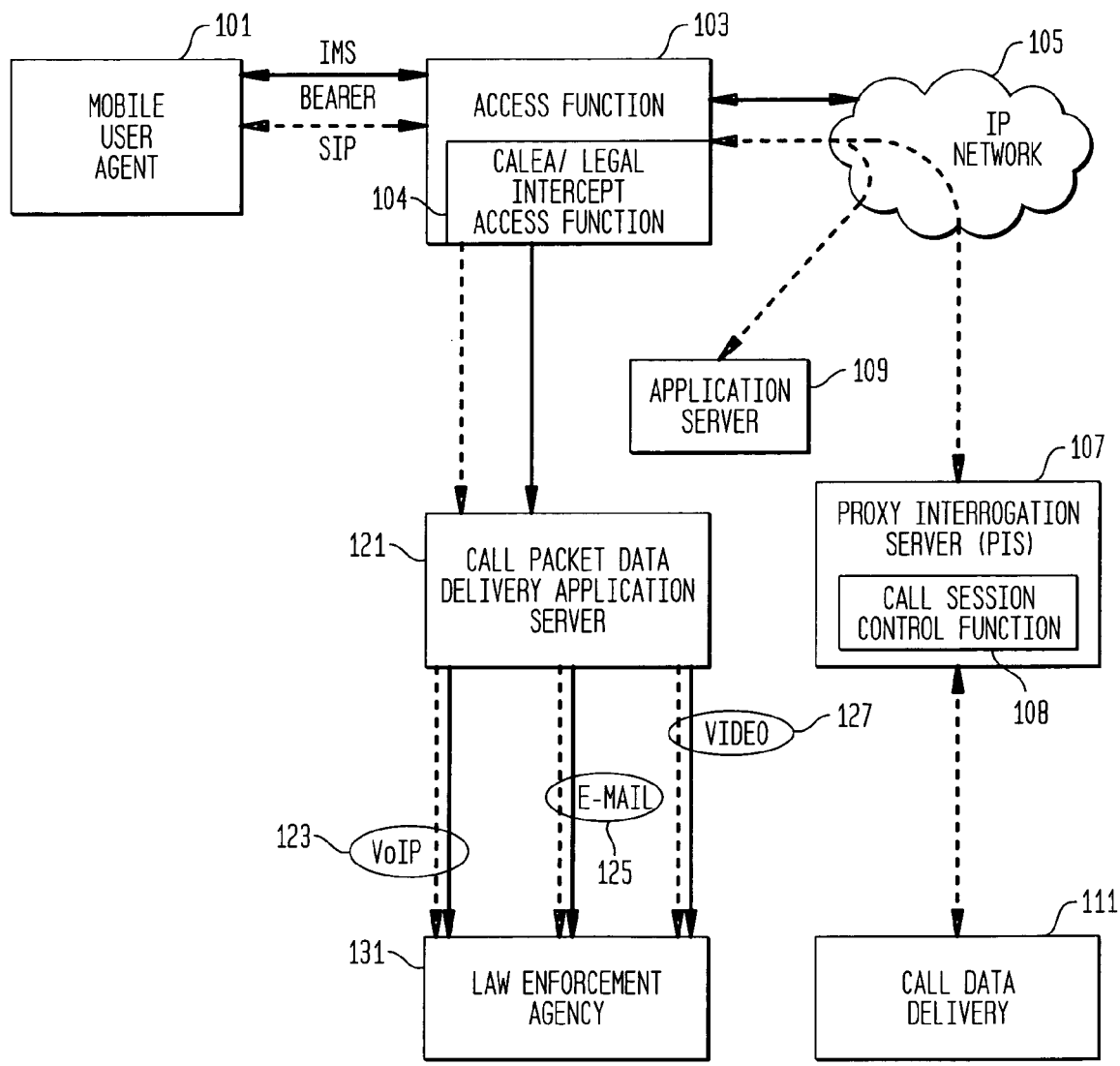

PROVIDING CALEA/LEGAL INTERCEPT INFORMATION TO LAW ENFORCEMENT AGENCIES FOR INTERNET PROTOCOL MULTIMEDIA SUBSYSTEMS (IMS)

TECHNICAL FIELD

This invention relates to methods and apparatus for providing bearer data and call control signaling information to law enforcement agencies.

BACKGROUND OF THE INVENTION

The IP (Internet Protocol) Multimedia Subsystem (IMS) is an Internet based technology within the service provider wireless network which communicates with a mobile station over a standard data pipe provided by the Universal Mobile Telecommunications System (UMTS) packet data system, a third generation packet telecommunications system. IMS can also be used with other wireless technologies such as Wi-Fi (wireless local area network products based on the IEEE 802.11 specification) and North American CDMA. For setting up connections, a client server model is used between the mobile station and the IMS network element called the Call Session Control Function (CSCF). Session Initiation Protocol (SIP) messages are used to configure the call. After session setup, IMS becomes a peer-to-peer communication directly between the mobile station and another IMS capable endpoint. This means that the wireless data transport system such as the UMTS packet data system is used merely to transport data, and under current standards does not have knowledge of the contents of IMS related SIP messages. CALEA and legal intercept laws require a service provider to provide call content and to make possible the correlation of CSCF SIP messages with this call content.

A problem of the prior art is that the arrangements for providing the required information to the CALEA/Legal Intercept collection function of law enforcement provides the CSCF SIP messages by a different path than the bearer content of the peer-to-peer communication messages since the CSCF SIP messages are forced to traverse the Internet before reaching the CALEA/Legal Intercept collection function. This delay makes it difficult to correlate bearer content with specific call arrangements contained in the CSCF SIP messages. The delay also makes it impossible to perform real time extraction from the bearer stream of specific services such as Voice over IP (VoIP) that are of great interest to law enforcement. With the prior art all services must be delivered to law enforcement possibly in violation of court orders.

SUMMARY OF THE INVENTION

The above problem of delay is substantially alleviated in accordance with this invention wherein the CALEA/Legal Intercept access function for IMS (e.g. the UMTS SGSN or GGSN, WI-FI node, or CDMA PDSN) detects communications from or to mobile stations that have been authorized for monitoring (i.e., tapping), and is required to send copies of the information represented by the SIP messages along with the copies of the bearer messages in the same packet stream in temporal order of receipt by the access function to an LEA monitoring point. CALEA/Legal Intercept access functions are in a good position to associate the bearer messages with their corresponding SIP signaling messages.

In accordance with one feature of Applicants' invention, a call packet delivery application server is interposed between the access functions and the LEA monitoring system. This application server uses the SIP messages embedded with the bearer messages to identify the bearer messages of each service within the bearer stream, such as a video stream, an e-mail stream, or the voice over IP stream, to permit independent delivery of these bearer streams to the CALEA/Legal Intercept monitoring system. If a court order does not apply to a service, then the application server can block delivery of these services thereby enforcing the court order.

The SIP messages embedded with the stream of IMS bearer packets act as identifiable marker packets in the bearer packet stream. The corresponding SIP messages copied at the CSCF act as corresponding marker packets in the SIP message stream from the CSCF. This allows special processing of the packet streams containing these marker packets.

BRIEF DESCRIPTION OF THE DRAWING(S)

Figure 2:
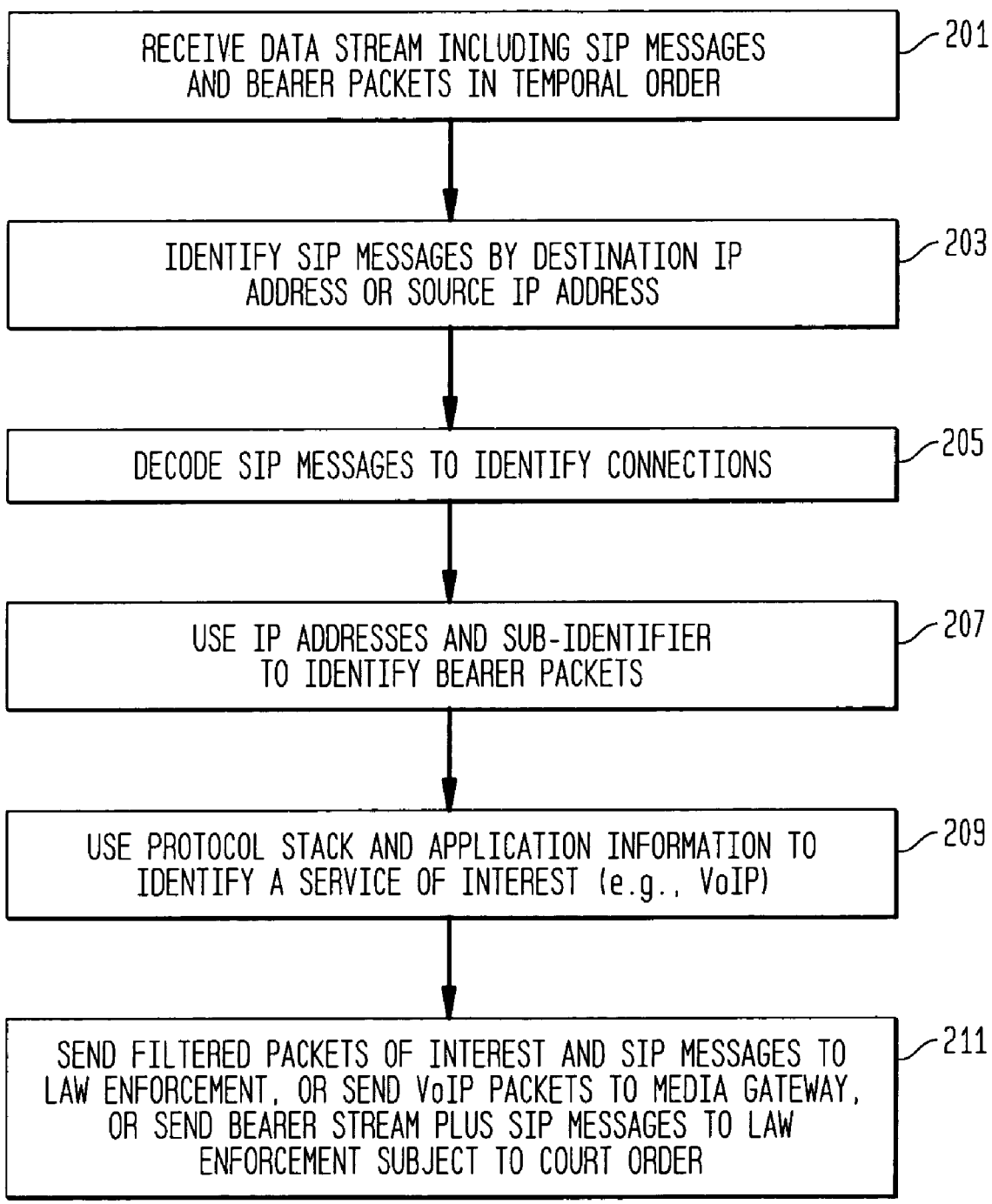

FIG. 1 is a block diagram illustrating bearer data flow and signaling data flow for an IMS system; and FIG. 2 is a flow diagram illustrating the operation of a call packet delivery application server interposed between a CALEA/Legal Intercept access function for IMS and a CALEA/Legal Intercept collection function.

DETAILED DESCRIPTION

FIG. 1 is a block diagram illustrating the operation of Applicants' invention. Unit 101 is a mobile station that may contain an IMS User Agent to generate outgoing SIP messages, receive incoming SIP messages, and to generate and receive IMS bearer packet streams. The mobile station/User Agent 101 communicates with block 103 that represents the circuits of a wireless packet data system, also serving as the CALEA/Legal Intercept access function, for giving the mobile station access to a common carrier, in this case to the Internet (IP network) 105 and via the Internet to IMS application servers 109 and proxy interrogating servers (PIS) 107. An example of a wireless packet data system is the UMTS packet data system, consisting of radio access via a Node B cell connecting to a Radio Network controller (RNC) connected to a Serving General Packet Radio Service Support Node (SGSN) connected to a Gateway General Packet Radio Service Support Node (GGSN). Server 107 includes a Call Session Control Function entity 108 which is used to control establishment of connections through the Internet. The application servers 109 are similarly equipped to send control messages to the Internet to provide enhanced services. In order to establish these connections, application server 109 and proxy interrogating server 107 receive/send session initiation protocol messages via access functions such as 103 to IMS capable mobile stations containing an IMS User Agent. The wireless packet data system of block 103 controls the establishment of basic packet transport through IP network 105. If the CALEA/Legal Intercept access function 104 in access function 103 recognizes that a source or a destination is to have its bearer packets monitored by the CALEA/legal intercept collection function 131, then the CALEA/Legal Intercept access function 104 establishes a connection to the call packet delivery application server 121.

In accordance with the teachings of the prior art, if the proxy interrogating server (PIS) 107 containing the Call Session Control Function 108 recognizes that the call is to be monitored by the CALEA monitoring station, then PIS 107 sends SIP messages for that call to a call data delivery unit 111 which forwards these SIP messages to the CALEA/Legal Intercept collection function. In accordance with the prior art, this is the arrangement for transmitting SIP messages to the CALEA/Legal Intercept collection function.

In accordance with the Applicants' invention, the access function, after detecting the need to establish a parallel packet connection to allow delivery of copies of IMS bearer packets to the CALEA/Legal Intercept collection function, arranges to transmit in temporal order of receipt by the access function both copies of all SIP messages used to establish the connections for a call that is to be monitored and copies of bearer packets associated with these connections in the same packet stream bound for the CALEA/Legal Intercept collection function 131 or, in accordance with a feature of Applicants' invention, to a call packet delivery application server 121. This server will then use information of the received SIP messages to identify within the same packet stream individual IMS bearer packet streams and will send these individual packet streams along with the corresponding SIP messages to the CALEA/Legal Intercept collection function. FIG. 1 shows three separate IMS streams: a voice over IP stream 123, an e-mail stream 125, and a video stream 127, each accompanied by an SIP signaling stream still in temporal order. By sending the associated SIP messages with each of the separate IMS streams, the call packet delivery application server 121 permits the correlation of SIP messages originated by the CSCF with bearer stream SIP messages by the comparing the "branch" parameter values in the "Via" field of the SIP messages from each source.

FIG. 2 illustrates the operation of the call packet delivery application server 121 (FIG. 1). The application server receives a data stream consisting, in temporal order, of embedded SIP messages sent from or received by the mobile station and bearer packets containing user data (action block 201). The application server identifies the appropriate SIP messages by the destination IP address of the packets that carry the SIP messages coming from the mobile station, or the source address of packets that carry SIP messages coming from the IP network. These IP addresses will be that of a CSCF 108 or some other IMS application server 109. The call packet delivery application server 121 will have access to a database (not shown) for such IP addresses.

The call packet delivery application server will then decode the SIP messages (action block 205) to determine the structure of the accompanying bearer packets. The SIP messages will indicate the destination and return IP address of bearer packets, some sub-identifier for endpoint routing (e.g. the TCP or UDP port), the protocol stack above the IP layer, and the application carried by the bearer (e.g., voice over IP).

The call packet delivery application server will then use the IP addresses of the bearer packets and sub-identifier (e.g. port number) to identify these packets and filter them out of the data stream that also contains SIP message packets (action block 207).

The application server will then use the protocol stack and application information from the SIP messages to extract from the full bearer packet stream a packet stream of particular interest to law enforcement agency (e.g., voice over IP) (action block 209).

The application server will then send the packets filtered for the service of interest, and the SIP messages used to decode the packets of the service to a law enforcement agency, or for voice over IP, send IP bearer packets to a media gateway for conversion to circuit voice for subsequent use by the CALEA monitoring system, or send the entire bearer stream to law enforcement with the embedded SIP messages to allow the law enforcement monitor system to do the decoding (action block 211).

The application server, if reformatting SIP messages, must retain all information in the "Via" field of the SIP messages. This is done to allow comparison of the "branch" parameter in the "Via" field contained in the SIP messages sent to the application server from the access function with the same parameters that always appear in the corresponding SIP messages sent by the CSCF.

The function of the call packet delivery application server can be distributed with various functions such as message correlation and bearer packet identification being performed in different parts of the network.

The specific embodiment described herein is for monitoring packetized data messages by a CALEA/Legal Intercept system. The basic arrangement of the invention can be used whenever two packet streams, such as a message packet stream and its associated signaling packet stream, are to be correlated in time. The arrangement of the invention embeds readily identifiable marker packets between the normal packets in one packet stream (in this case the SIP messages flowing between the mobile/user agent and the CSCF are embedded with IMS bearer packets), and corresponding marker packets within a second stream (in this case the same SIP messages naturally received at the CSCF with all other SIP message received or sent by the CSCF). The marker packets are embedded upon the occurrence of an event known to both streams (in this case the passing of a SIP message between the access function and the CSCF). The occurrence of the marker packets in a stream shows the temporal order of the events causing the creation of the marker packets, thus allowing these events to be correlated between the two data streams and allowing normal packets (in this case monitored IMS bearer packets or SIP messages at the CSCF) occurring between the events to be identified. The marker packets may contain information about the surrounding normal packets (in this case the SIP messages contain information that identifies IMS bearer packets and specifies their structure) that allow real time decoding or filtering of the normal packets.

The above description is of one preferred embodiment of Applicants' invention. Other embodiments will be apparent to those of ordinary skill in the art without departing from the scope of the invention. The invention is limited only by the attached claims.

We claim:

1. In an Internet Protocol Multimedia System (IMS), a method of providing bearer data to a CALEA/Legal Intercept System, comprising the steps of:
   receiving said bearer data and related session initiation protocol (SIP) messages over a direct connection at an access system connectable to the Internet;
   at said access system, recognizing that said SIP messages designate a source or destination being monitored by a CALEA/Legal Intercept System; and
   responsive to said recognition, sending said bearer data and said related SIP messages from said access system to said CALEA/Legal Intercept System in temporal order of receipt by the access function without passing through the Internet.

2. The method of claim 1 wherein the step of sending said bearer data and said related SIP messages to said CALEA/Legal Intercept System comprises the steps of:
   sending said bearer data and said related SIP messages from said access system to a call packet delivery application server;
   in said application server, associating SIP messages with corresponding bearer data; and
   sending the associated SIP messages bundled with said corresponding bearer data directly to said CALEA/Legal collection function without passing through the Internet when a court order allows.

3. The method of claim 2 wherein said bearer data is sent from a mobile station.

4. The method of claim 2 wherein said bearer data is sent from a land-line station.

5. In an Internet Protocol Multimedia System (IMS), apparatus for providing bearer data to a CALEA/Legal Intercept System, comprising:

means for receiving said bearer data and related session initiation protocol (SIP) messages over a direct connection at an access system connectable to the Internet;

at said access system, means for recognizing that said SIP messages designate a source or destination being monitored by a CALEA/Legal Intercept System; and means, responsive to said recognition, for sending said bearer data and said related SIP messages from said access system to said CALEA/Legal Intercept System in temporal order of receipt by the access function without passing through the Internet.

6. The apparatus of claim 5 wherein the means for sending said bearer data and said related SIP messages to said CALEA/Legal Intercept System comprise:

means for sending said bearer data and said related SIP messages to a call packet delivery application server;

in said application server, means for associating SIP messages with corresponding bearer data; and means for sending the associated SIP messages bundled with said corresponding bearer data to said CALEA/Legal collection function without passing through the Internet when a court order allows.

7. The apparatus of claim 6 wherein said bearer data is sent from a mobile station.

8. The apparatus of claim 6 wherein said bearer data is sent from a land-line station.

* * * * *